US010969002B2

(12) United States Patent
Sperlich et al.

(10) Patent No.: US 10,969,002 B2
(45) Date of Patent: Apr. 6, 2021

(54) RETAINER PLATES FOR FIXING PLANET CARRIER AND RING GEAR

(71) Applicants: ZF Friedrichshafen AG, Friedrichshafen (DE); ZF Wind Power Antwerpen N.V., Lommel (BE)

(72) Inventors: Ralf Sperlich, Witten (DE); Joerg Muench, Wuppertal (DE); Dirk Strasser, Breckerfeld (DE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 53 days.

(21) Appl. No.: 16/347,203

(22) PCT Filed: Nov. 3, 2017

(86) PCT No.: PCT/EP2017/078216
§ 371 (c)(1),
(2) Date: May 3, 2019

(87) PCT Pub. No.: WO2018/087009
PCT Pub. Date: May 17, 2018

(65) Prior Publication Data
US 2020/0056679 A1    Feb. 20, 2020

(30) Foreign Application Priority Data
Nov. 9, 2016    (DE) .................. 10 2016 221 961

(51) Int. Cl.
*F16H 57/08*    (2006.01)
*F16H 1/46*    (2006.01)
(Continued)

(52) U.S. Cl.
CPC ............ *F16H 57/082* (2013.01); *F16H 1/46* (2013.01); *F16H 2055/176* (2013.01); *F16H 2057/02078* (2013.01)

(58) Field of Classification Search
CPC ............ F16H 2055/176; F16H 57/082; F16H 2057/02078
See application file for complete search history.

(56) References Cited

U.S. PATENT DOCUMENTS 3,986,413 A    10/1976 Stockton
4,417,485 A    11/1983 Boor
(Continued)

FOREIGN PATENT DOCUMENTS

DE    102011118832 A1    5/2013
DE    102014208793 A1    11/2015

*Primary Examiner* — David R Morris
(74) *Attorney, Agent, or Firm* — Leydig, Voit & Mayer, Ltd.

(57) ABSTRACT

An assembly includes a first planetary stage, a second planetary stage, and at least one retainer plate. The first planetary stage has a planet carrier and the second planetary stage has a ring gear. The planet carrier and the ring gear are configured to be rotated about a common axis of rotation. The retainer plate is attached to the ring gear and engages in a groove in the planet carrier. The groove and the axis of rotation are at least partially skewed to each other. The retainer plate is arranged at least partially on a first side of a first plane and on a first side of a second plane. The first plane and the second plane intersect along the axis of rotation. All planet bolts fixed in the planet carrier each lie on a second side of the first plane and/or the second plane.

16 Claims, 1 Drawing Sheet

(51) Int. Cl.
*F16H 55/17* (2006.01)
*F16H 57/02* (2012.01)

(56) References Cited

U.S. PATENT DOCUMENTS

| | | | | |
|---|---|---|---|---|
| 6,832,974 | B2* | 12/2004 | Kakamu | F16H 63/3026 |
| | | | | 475/146 |
| 8,961,359 | B2* | 2/2015 | Floro | F16D 13/76 |
| | | | | 475/331 |
| 9,316,290 | B2* | 4/2016 | Bauer | F16H 57/082 |
| 9,631,701 | B2* | 4/2017 | Ziemer | F16H 1/2863 |
| 9,676,463 | B1* | 6/2017 | Fortl | F16H 3/44 |
| 2003/0232693 | A1* | 12/2003 | Kakamu | F16H 57/08 |
| | | | | 475/331 |
| 2005/0085325 | A1* | 4/2005 | Kakamu | F16H 63/3026 |
| | | | | 475/146 |
| 2015/0038284 | A1 | 2/2015 | Bauer | |
| 2015/0323061 | A1 | 11/2015 | Ziemer et al. | |

* cited by examiner

RETAINER PLATES FOR FIXING PLANET CARRIER AND RING GEAR

CROSS REFERENCE TO RELATED APPLICATIONS

This application is a U.S. National Stage Application under 35 U.S.C. § 371 of International Application No. PCT/EP2017/078216 filed on Nov. 3, 2017, and claims benefit to German Patent Application No. DE 10 2016 221 961.8 filed on Nov. 9, 2016. The International Application was published in German on May 17, 2018 as WO 2018/087009 A1 under PCT Article 21(2).

FIELD

The invention relates to an assembly having a first planetary stage, a second planetary stage and at least one retainer plate.

BACKGROUND

In order to prevent a planet carrier and a ring gear from shifting axially against each other, plates that are screwed to the ring gear and engage in a groove of the planet carrier are known from the prior art. In such cases, deformations of the ring gear can lead to problems. Due to the axial fixing in the groove, the plates can follow such deformations only to a limited extent. The resulting load peaks can cause damage to the plates and the groove.

SUMMARY

In an embodiment, the present invention provides an assembly. The assembly includes a first planetary stage, a second planetary stage, and at least one retainer plate. The first planetary stage has a planet carrier and the second planetary stage has a ring gear. The planet carrier and the ring gear are connected to each other for conjoint rotation and are configured to be rotated about a common axis of rotation. The retainer plate is attached to the ring gear and engages in a groove in the planet carrier. The groove and the axis of rotation are at least partially skewed to each other. The retainer plate is arranged at least partially on a first side of a first plane and on a first side of a second plane. The first plane and the second plane intersect along the axis of rotation. All planet bolts fixed in the planet carrier each lie on a second side of the first plane and/or on a second side of the second plane. All arms of the planet carrier each lie on the second side of the first plane and/or on the second side of the second plane.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
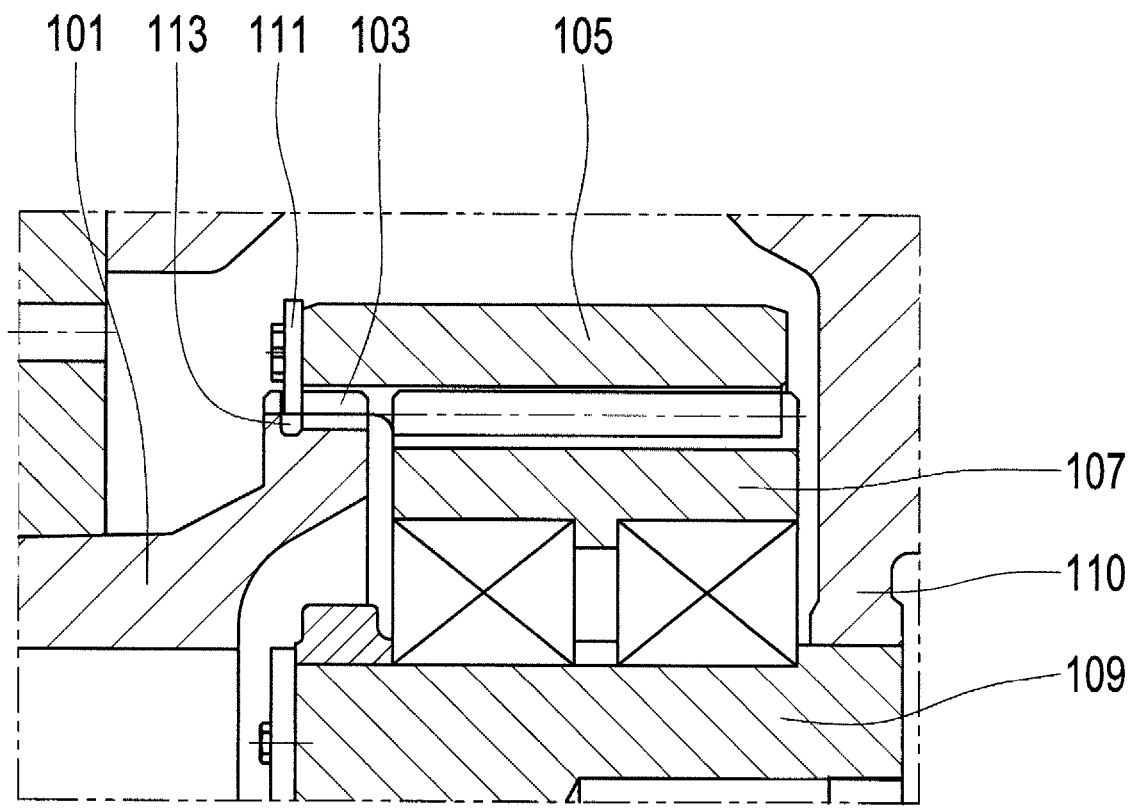
FIG. 1 shows a first section of a gearbox.

Assemblies according to the invention create a rotationally fixed connection between a planet carrier of a first planetary stage and a ring gear of a second planetary stage, which forms a power split with the first planetary stage. Assemblies according to the invention fix a planet carrier and a ring gear together, while avoiding inherent disadvantages of the solutions known from the prior art. In particular, in assemblies according to the invention, the susceptibility to wear and defects of such a fixing is reduced and durability is improved.

According to an embodiment of the invention, an assembly comprises a first planetary stage, a second planetary stage and at least one retainer plate.

A planetary stage is a gearbox stage with one ring gear, one planet carrier, one or more planetary gears and one sun gear. The planetary gears are rotatably mounted in the planet carrier and mesh with the sun gear and/or the ring gear. At least one of the planetary gears meshes with the sun gear and at least one additional planetary gear meshes with the ring gear. At least two of the three components of ring gear, planet carrier and sun gear are rotatably mounted. The third component is arranged to be rotationally fixed. In this way, a gear degree of freedom of 1 is achieved when the third component is arranged to be rotationally fixed, or of 2 when the third component is arranged to be rotatable.

In the present case, the planet carrier of the first planetary stage and the ring gear of the second planetary stage are rotatably mounted around a common axis of rotation, and are also connected to each other for conjoint rotation. The planet carrier and the ring gear can thus be rotated together, but not relative to each other.

The planet carrier and the ring gear are preferably connected to each other for conjoint rotation via a spline. A spline, also known as plug-in toothing, is a multiple driver connection consisting of two individual toothings inserted into each other. The planet carrier and the ring gear each form one of these individual toothings.

The spline creates a rotationally fixed connection, but the individual toothings can be displaced axially against each other. The retainer plate serves to secure the planet carrier and the ring gear against such displacement. The planet carrier forms at least one groove in which the retainer plate engages. In this way, a positive-locking fixing between the retainer plate and the planet carrier is achieved. Furthermore, the retainer plate is attached to the ring gear or fixed to the ring gear, as the case may be. The retainer plate is preferably fixed to the ring gear in a positive-locking manner, for example through a threaded connection. The retainer plate is fixed to the ring gear in such a way that the retainer plate is immovable with respect to the ring gear; that is, no relative movements can take place between the retainer plate and the ring gear.

At least a part of the groove and the common axis of rotation of the planet carrier and the ring gear are skewed; that is, anti-parallel to each other. In particular, a longitudinal axis of the groove in the specified part is skewed to the axis of rotation.

The longitudinal axis is characterized by the fact that cross-sections of the groove along the longitudinal axis are congruent. To produce the groove, a tool (such as a milling cutter) is moved along the longitudinal axis.

The specified part of the groove or its longitudinal axis, as the case may be, preferably runs in the part and the common axis of rotation of the planet carrier and of the ring gear are orthogonal to each other. The groove or its longitudinal axis, as the case may be, and the common axis of rotation of the planet carrier and the ring gear have no common intersection point.

The retainer plate engaging in the groove can be moved in the direction of the longitudinal axis of the groove but not orthogonally to it. The described alignment of the groove or its longitudinal axis, as the case may be, relative to the common axis of rotation of the planet carrier and the ring gear therefore limits the axial displaceability of the groove. As a result, the displaceability of the ring gear relative to the planet carrier is also limited in the axial direction.

The planet carrier has two flanges that essentially run axially and two arms that are essentially radially aligned. The flanges are offset in an axial direction relative to each other and are connected to each other by the arms. The arms run accordingly between the flanges. In particular, the flanges and the arms may be connected to each other in one piece.

The planetary gears are usually rotatably mounted on planet bolts. The planet bolts are in turn fixed in the planet carrier. So-called "bolt seats" are used for this purpose. These are through-holes or blind holes, which are aligned in pairs, and into which the planet bolts are inserted.

The deformation of the ring gear described above is subject to local maxima and minima. The present invention has found that the deformation between a planet bolt or a bolt seat and an arm is the smallest. Therefore, in accordance with embodiments of the invention, the retainer plate is therefore arranged here.

In detail, the retainer plate is arranged at least partially on a first side of a first plane and on a second side of a second plane. A "plane" is understood here to be a flat, unbounded surface in the geometric sense. In particular, it is not a physical object, but merely a notional construct.

Each plane has two sides that are separated from each other by the plane. Thus, the first plane and the second plane have in each case, in addition to the first side, a second side that is different from the first side. All planet bolts fixed in the planet carrier are arranged on the second side of the first plane and/or on the second side of the second plane. Correspondingly, all arms of the planet carrier are arranged on the second side of the first plane and/or the second side of the second plane. This means that none of the planet bolts and none of the arms are at least partially on the first side of the first plane and on the first side of the second plane.

The first plane and the second plane intersect. Their intersections form a straight line. This is identical with the common axis of rotation of the planet carrier and the ring gear.

In order to ensure that the retainer plate can only be used in the position in accordance with the invention, the planet carrier preferably has at least one further groove that runs radially; that is, its longitudinal axis intersects the common axis of rotation of the planet carrier and the ring gear and is aligned in a manner orthogonal to it. The retainer plate has a lug that engages in the radial groove.

The idea in accordance with the invention is also realized by an arrangement in which the positions of the retainer plate and the groove are reversed; that is, when the ring gear has the groove and the retainer plate is attached to the planet carrier.

The gearbox shown in sections in FIG. 1 is a gearbox of a wind turbine. FIG. 1 shows a rotatably mounted planet carrier 101 of a first planetary stage, which via a spline 103 is connected in a rotationally fixed manner to an equally rotatably mounted ring gear 105 of a second planetary stage.

The first planetary stage and the second planetary stage effect a power split.

In addition to the ring gear 105, the second planetary stage includes planetary gears 107, planet bolts 109 and a planet carrier 110. Each of the planetary gears 107 is rotatably mounted on one of the planet bolts 109 and meshes with the ring gear 105.

Figure 2:
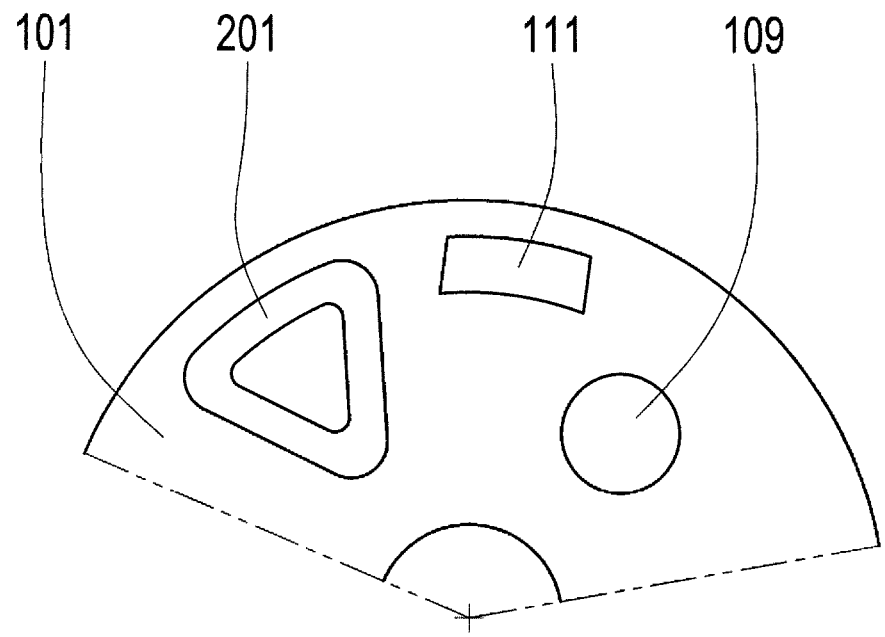
FIG. 2 shows a second section of the gearbox.

Retainer plates 111 are used to fix the ring gear 105 axially in the planet carrier 101. For this purpose, the retainer plates 111 are screwed to the ring gear 105 and engage in a groove 113 of the planet carrier 101. The groove 113 runs in a circular form around a common axis of rotation of the planet carrier 101 and the ring gear 105. Each of the retainer plates 111 is arranged between a planet bolt 109 and an arm 201 of the planet carrier 113 shown in FIG. 2. If the retainer plates 111, as shown in FIG. 2, are located centrally between the arm and the planet bolt 109, deformations of the ring gear 105 caused by loads will be minimal.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

101 Planet carrier
103 Spline
105 Ring gear
107 Planetary gear
109 Planet bolt
110 Planet carrier
111 Retainer plate
113 Groove
201 Arm

The invention claimed is:
1. An assembly, comprising:
a first planetary stage having a planet carrier;
a second planetary stage having a ring gear; and
at least one retainer plate attached to the ring gear and configured to engage a groove in the planet carrier,
wherein the planet carrier and the ring gear are connected to each other for conjoint rotation and are configured to be rotated about a common axis of rotation,
wherein the groove in the planet carrier has a longitudinal axis, the longitudinal axis and the axis of rotation being anti-parallel skew lines that have no common intersection point, wherein the retainer plate is arranged at least partially on a first side of a first plane and on a first side of a second plane, the first plane and the second plane intersecting one another along the axis of rotation, wherein all planet bolts fixed in a second planet carrier of the second planetary stage each lie on a second side of the first plane and/or on a second side of the second plane, and wherein all arms of the second planet carrier each lie on the second side of the first plane and/or on the second side of the second plane.

2. The assembly according to claim 1, wherein the groove in the planet carrier has cross sections along the longitudinal axis that are congruent.

3. The assembly according to claim 1, wherein the retainer plate is fixed to the ring gear in such a way that the retainer plate is immovable with respect to the ring gear.

4. The assembly according to claim 1, wherein the retainer plate is attached to the ring gear via a threaded connection.

5. The assembly according to claim 1, wherein the planet carrier includes two flanges that extend in an axial direction and two arms that are aligned in a radial direction.

6. The assembly according to claim 5, wherein the flanges are offset in an axial direction relative to each other and are connected to each other by the two arms.

7. The assembly according to claim 1, wherein the planet carrier includes a second groove that extends in a radial direction such that the second groove has a longitudinal axis that intersects the common axis of rotation.

8. The assembly according to claim 7, wherein the retainer plate includes a lug configured to engage in the second groove.

9. The assembly according to claim 1, wherein the assembly is a component of a gearbox of a wind turbine.

10. An arrangement, comprising:
a first planetary stage having a planet carrier;
a second planetary stage having a ring gear; and
at least one retainer plate attached to the ring gear and configured to engage a groove in the planet carrier, wherein the planet carrier and the ring gear are connected to each other for conjoint rotation and are configured to be rotated about a common axis of rotation, wherein the groove in the planet carrier has a longitudinal axis, the longitudinal axis and the axis of rotation being anti-parallel skew lines that have no common intersection point, wherein the retainer plate is arranged at least partially on a first side of a first plane and on a second side of a second plane, the first plane and the second plane intersecting along the axis of rotation, wherein all planet bolts fixed in a second planet carrier of the second planetary stage lie in each case on a second side of the first plane and/or on a second side of the second plane, and wherein all arms of the second planet carrier lie in each case on the second side of the first plane and/or on the second side of the second plane.

11. The assembly according to claim 10, wherein the groove in the ring gear has cross sections along the longitudinal axis that are congruent.

12. The assembly according to claim 10, wherein the retainer plate is fixed to the planet carrier in such a way that the retainer plate is immovable with respect to the planet carrier.

13. The assembly according to claim 10, wherein the retainer plate is attached to the planet carrier via a threaded connection.

14. The assembly according to claim 10, wherein the planet carrier includes two flanges that extend in an axial direction and two arms that are aligned in a radial direction.

15. The assembly according to claim 14, wherein the flanges are offset in an axial direction relative to each other and are connected to each other by the two arms.

16. The assembly according to claim 10, wherein the assembly is a component of a gearbox of a wind turbine.

\* \* \* \* \*